United States Patent [19]
McCracken

[11] 3,874,090
[45] Apr. 1, 1975

[54] METHOD AND APPARATUS FOR DRYING POLYMERIC MATERIALS

[75] Inventor: Nathan John McCracken, Sarnia, Ontario, Canada

[73] Assignee: Polysar Limited-Polysar Limitee, Sarnia, Ontario, Calif.

[22] Filed: Mar. 2, 1973

[21] Appl. No.: 337,701

Related U.S. Application Data

[62] Division of Ser. No. 289,567, Sept. 15, 1972, Pat. No. 3,834,440.

[52] U.S. Cl.......................... 34/61, 34/70, 159/2 E, 100/93 S, 100/145
[51] Int. Cl............................................. F26b 19/00
[58] Field of Search.............. 34/12, 15, 61, 69, 70, 34/42; 425/207–209; 159/2 E; 100/145, 93 S

[56] References Cited
UNITED STATES PATENTS

| | | | |
|---|---|---|---|
| 3,067,462 | 12/1962 | Kullgren | 34/92 |
| 3,078,512 | 2/1963 | De Haven | 159/2 E |
| 3,192,564 | 7/1965 | Beck et al. | 159/2 E |

FOREIGN PATENTS OR APPLICATIONS

734,182   7/1955   United Kingdom............... 159/2 E

*Primary Examiner*—Kenneth W. Sprague
*Assistant Examiner*—James G. Yeung
*Attorney, Agent, or Firm*—Stevens, Davis, Miller & Mosher

[57] ABSTRACT

An improved extrusion dryer for drying wet polymeric materials comprises a compression zone where the wet material is compressed and heated and an expansion zone where the compressed hot material is allowed to expand and the volatile liquid to volatilize. The expanded material is conveyed by screw to an unrestricted outlet where it is separated from vapours and isolated in the dry form.

The extrusion dryer of this invention operates at low temperatures and low power consumption and is suitable for drying at high throughput rates elastomeric polymers such as polybutadiene, butyl rubber, as well as heat sensitive polymers.

5 Claims, 4 Drawing Figures

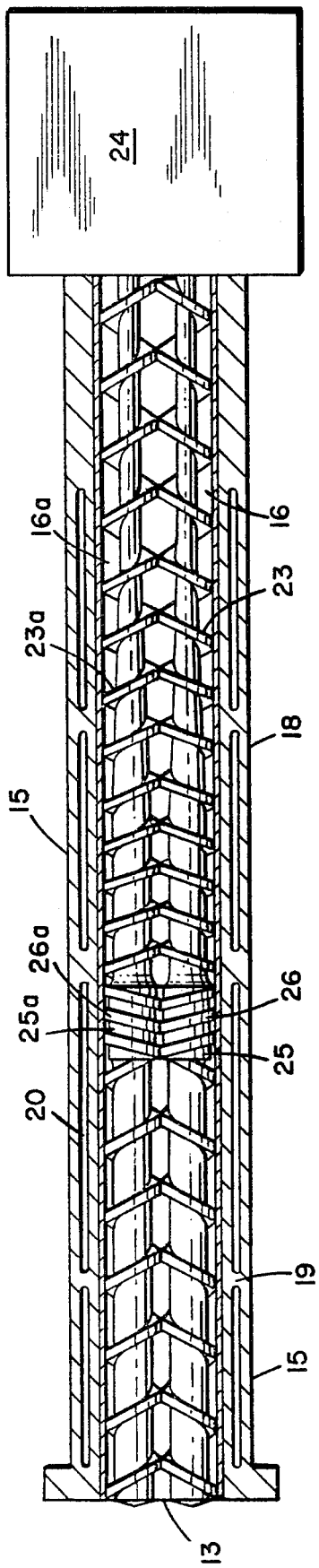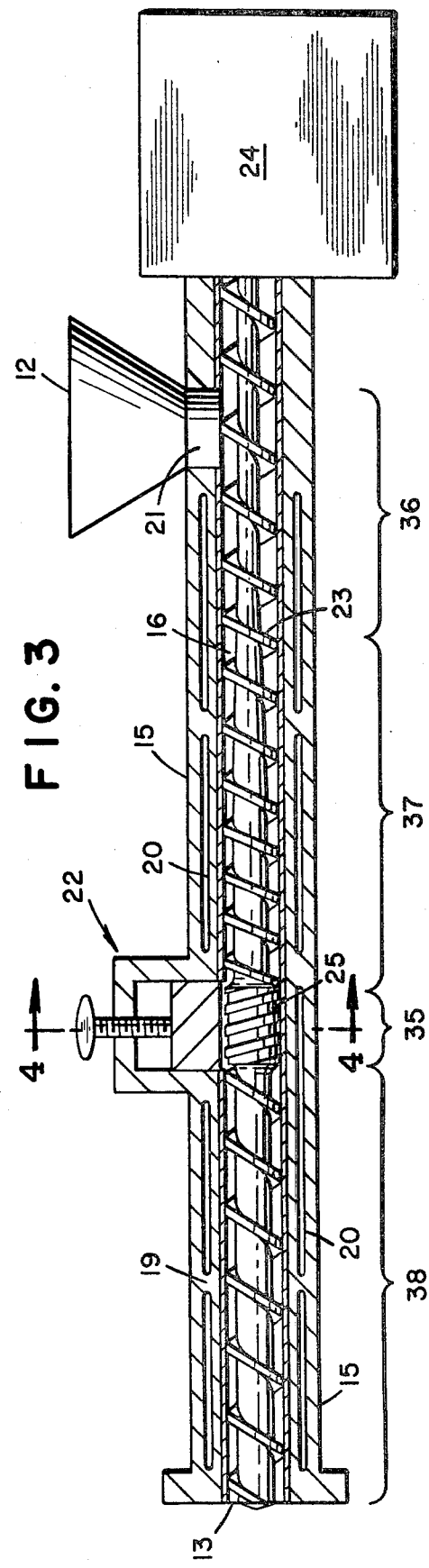

METHOD AND APPARATUS FOR DRYING POLYMERIC MATERIALS

This is a division, of application Ser. No. 289,567, filed Sept. 15, 1972, now U.S. Pat. No. 3,834,440.

This invention relates to method and apparatus for drying polymeric materials such as wet rubber crumb. More particularly, the invention relates to improvements in the apparatus and in the operation of extrusion dryers.

BACKGROUND OF THE INVENTION

In the production of synthetic polymers such as synthetic rubber, the material emerges from the polymerization process as a slurry of the material in water. Before the material can be baled or otherwise used, it must be dewatered and then dried to a moisture level of less than 1 percent. Drying is generally accomplished by one of two means: mechanical or tunnel dryers. In tunnel dryers, the material is passed through an enclosed, heated atmosphere where water freely evaporates and is drawn off, and the material emerges substantially dry. Mechanical dryers, as distinct from tunnel dryers, are often referred to as expander or extrusion dryers.

Present extrusion dryers work on the well-known worm-screw extrusion machine principle. They may be divided into single and multiple screw types. The former is exemplified in the apparatus described in U.S. Pat. No. 3,222,797. A multiple screw type dryer is described in Reissue U.S. Pat. No. 23,948, granted Feb. 15, 1955. Differing somewhat in detail, single and multiple screw dryers are essentially similar in their basic machine elements and operation.

In the single screw machine, the dewatered material is advanced along a barrel by a worm-screw against a restriction such as a multi-orifice die. Against the restriction, a back-pressure is built up and, due to mechanical working by the screw, the temperature in the material is increased. Heat may also be added by means of steam jackets surrounding the barrel. Although the sensible heat within the material is normally sufficient to vaporize the liquid element in the material, the back-pressure in the barrel is sufficient to prevent this occurring. Upon expulsion from the die into a zone of lower pressure, e.g., atmospheric pressure, flash vaporization takes place, the moisture escaping and rupturing the material into substantially dry crumb form.

In extrusion dryers of multiple screw type having two screws, for example, the material is advanced along a double barrel having contiguous parallel bores communicating via a central continuous slot, by twin worm-screws of opposite hand and rotation. At an intermediate position between an inlet at one end of the barrel and an outlet at the other end is a block valve comprising a block, slidably adjustable in a housing in communication with the bores and arranged to cooperate with blisters on the screws, generally known as compounders, to restrict flow and create a back-pressure in the material upstream of the valve. Downstream of the block valve is a low pressure zone which is vented to a low pressure source, e.g., atmosphere. Moisture from the evaporation taking place in this zone is vented off and the material is advanced to a single screw extrusion barrel where it is recompressed and at the same time reheated. Finally the material is expelled through die means where it forms a crumb and is conveyed away on a cooler/conveyor.

The electrical power requirements for extrusion dryers are approximately twice that of a tunnel dryer of similar capacity. More complicated in themselves and in their mode of operation, and operating as they do at high temperatures, extrusion dryers require complicated post-dryer equipment such as vibrating cooler/conveyors. In consequence, maintenance costs of all-mechanical systems can be as much as 80 percent higher than tunnel dryer systems.

There are of course some important advantages in the use of extrusion dryers: the product is more uniform, freer from contamination and less floor space is required than for tunnel dryers. If the machine capacities can be increased, the operating temperatures reduced, the power requirements lowered and the severe mechanical problems associated with dryer and post-dryer equipment can be alleviated, then mechanical drying systems prove superior over tunnel systems on all counts.

SUMMARY OF THE INVENTION

It has been discovered that in drying polymeric materials in extrusion dryers, considerably improved results are obtained in a machine which includes an adjustable, variable-flow restriction downstream of the inlet for creating a back-pressure in the material and a continuation bore and conveying means downstream of the restriction having an unrestricted outlet in communication with ambient atmosphere.

According to the present invention therefore there is provided a method of drying an extrudable polymeric material containing volatile material in an extruder comprising a number of zones which method comprises:

1. compressing the material in a zone maintained at a temperature capable of vaporizing the volatile liquid at atmospheric pressure and a pressure sufficient to prevent such vaporization;
2. forcing said compressed material through a restriction into an expansion zone maintained at reduced pressure whereby said liquid is vaporized and said polymeric material expanded; and
3. conveying said expanded material and vaporized liquid through the expansion zone wherein the vapor separates from said material.

In the utilization of the apparatus and method of the invention, the peak product temperatures of the extrudable material in the dryer and residence time at these temperatures have been reduced so as to enable more heat sensitive products to be successfully dried, and the throughput capacity of the dryer has been markedly increased over the capacity of the prior art extruders of the same size. Excessive mechanical stresses in the dryer have been eased because when running the machine at or close to capacity the power requirements of the machine are reduced. Finally, the residual temperature of the product leaving the dryer has been lowered.

Other advantages will be apparent to those skilled in the art from reading the following description taken in conjunction with the accompanying drawings in which like reference characters refer to like parts throughout the several views and in which:

DESCRIPTION OF THE DRAWINGS

FIG. 2, is a simplified plan view in section showing the apparatus of the invention;

FIG. 3, is a side elevation of the apparatus shown in FIG. 2; and

DETAILS OF THE INVENTION

Figure 1:
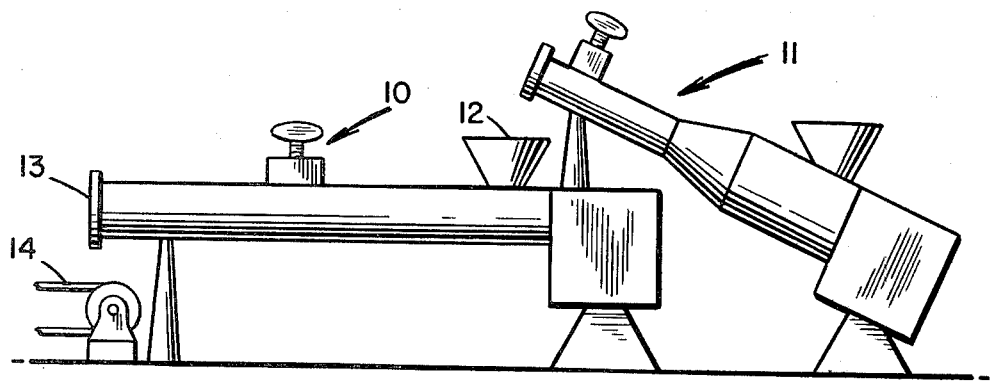
FIG. 1, is a diagrammatic representation of the apparatus of the present invention with associated equipment in a rubber drying process.

Referring to FIG. 1 there is shown an extrusion dryer according to the invention generally indicated at 10. To the right of the extrusion dryer is represented a deliquefying machine 11 which may be of the extrusion type shown or it may be equipment of any other well-known type adapted to reduce the liquid content of a slurry of synthetic rubber or other polymeric material to not more than 15 percent by weight and preferably to between 5 and 8 percent. The machine 11 is arranged to feed the deliquefied material into a hopper 12 of the dryer 10 while an outlet 13 discharges the dried material onto a cooler/conveyor 14 represented as a belt-type conveyor but which may be of the vibrator or any other type.

Figure 4:
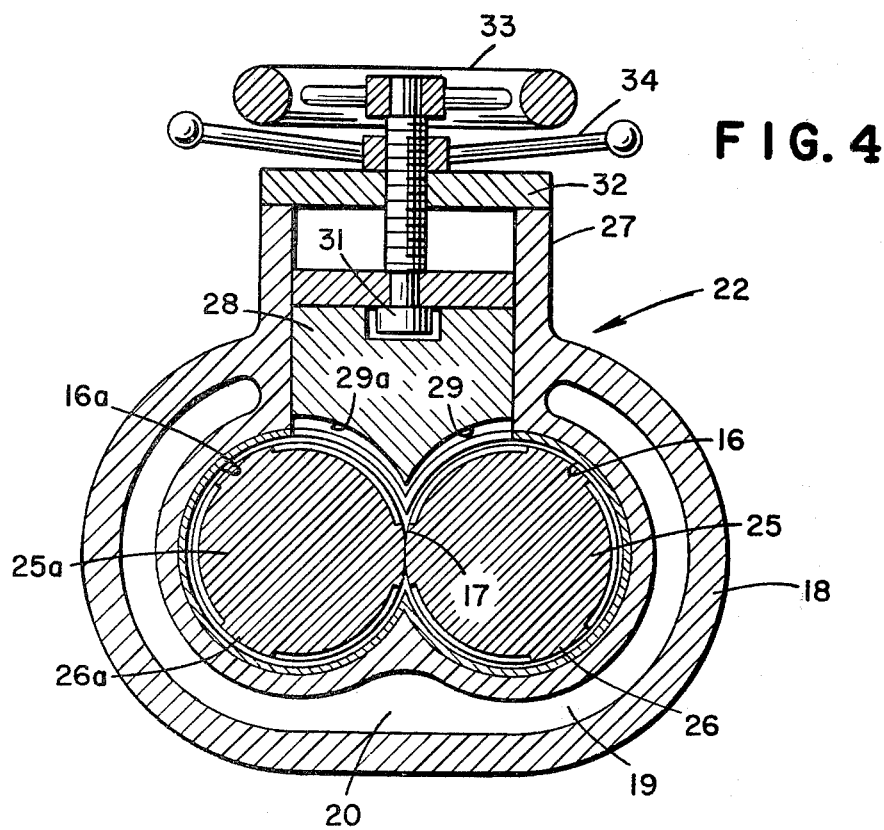
FIG. 4, is a cross-sectional elevation taken along the line 4—4 in FIG. 3.

Referring now more particularly to FIG. 2 through 4, a double-barrelled structure 15 is fabricated to define two parallel bores 16 and 16a formed so that they communicate with each other through a common slot 17 (FIG. 4) running the length of the barrel structure. Surrounding the barrel structure is a continuous sheath 18 spaced from the barrel structure and compartmented by transverse bulkheads such as 19 to provide a series of heating or cooling jackets 20 adapted to receive a flow of fluid such as steam or water or any other heat transfer medium from an exterior system.

Adjacent one end of the barrel structure remote from outlet 13 is a gravity feed inlet 21 surmounted by hopper 12 whereby particulate deliquefied material is fed to the bores 16 and 16a. Between the inlet 21 and the outlet 13 is a pressure block-valve indicated at 22. The valve will be more full described later herein.

Freely rotatable within the bores 16 and 16a are oppositely handed worm-screws 23 and 23a. Except for the harding of the flights, the worm-screws are precisely similar. They are preferably synchronized so that their flight crests are contiguous. The screws rotate in opposite directions: screw 23 in an anti-clockwise direction and screw 23a in a clockwise direction when viewed at the outlet 13. The screws are driven by power means such as an electric motor through a suitable transmission. The power means is generally indicated at 24.

The screws are designed to increase the pressure ratio up to valve 22 and this is done by gradually increasing the stem diameter and decreasing the pitch of the screw flights in well known manner. At valve 22, the screw stems are increased to form blisters 25 and 25a. These blisters carry multiple-start, shallow, reverse flights 26 and 26a on their peripheral surfaces. That is to say, flights 26 are of opposite hand to the main worm-screw 23 and flights 26a are of opposite hand to main worm-screw 23a. These blisters are sometimes referred to as compounders and there is a small running clearance between their flight crests and the barrel bores for a maximum flow restriction.

Integrally formed on the upper side of the barrel structure normal to the axes of the barrel bores is a hollow rectangular housing 27 which opens into the bores 16 and 16a. The housing carries a sliding valve block 28 with arcuate low surfaces 29 and 29a which are flush with the surfaces of bores 16 and 16a respectively when the block 28 is in its fully lowered position. The position of the block 28 is adjustable with respect to the blisters 25 and 25a to vary the clearance between the surfaces 29 and 29a and the blisters within a range from the fully lowered position to a position sufficiently removed from the blisters such that the material is allowed to by-pass the normal restriction of the blisters. By this means, therefore, is controlled the back-pressure in the material upstream of the block valve. Adjustability is effected by a screw 30 rotatably anchored to the valve block at 31 and threadibly engaging a member 32 bridging the top of valve housing 27. The screw is operated by a handwheel 33 and locked at the selected setting by a locknut 34.

Barrel structure 15 extending downstream of valve 22 is precisely similar to the structure upstream of the valve and is merely a continuation thereof. The block valve 22 defines a restriction zone 35 and divides the barrel structure into a high pressure compression zone 37, preceded by a feed zone 36, upstream of the valve and an expansion zone 38 downstream thereof. The flighted screws in expansion zone 38 are of constant pitch and stem diameter and, since in this portion of the machine the screws only have a conveying function, a lighter form of construction, e.g., sheet metal fabrication or machining from light alloy instead of steel alloy, may be used.

The dual screw extrusion dryer described hereinabove represents but one embodiment of the apparatus of this invention. It is also possible to use a single screw extrusion dryer having a compression zone and an extrusion zone provided with an unrestricted outlet for dry material and vapours and an adjustable restriction zone between said compression and expansion zones.

Operation of the extrusion dryer according to the present invention will be described by way of specific examples and the performance figures compared with performance figures obtained from a similar machine constructed in accordance with known art.

EXAMPLE 1

An aqueous slurry of 98 percent cis-1,4 polybutadiene having a Mooney viscosity (M/L-4' at 212°F) of 40 was dewatered in the dewatering machine 11 to about 6 percent moisture content and fed to the hopper 12 of the extrusion dryer 10. For start-up, heat was built up in the barrel structure by passing steam through the heating jackets 20 and the valve block 28 was partly backed off. Material entering the bores 16 and 16a through inlet 21 was conveyed therealong by screws 23 and 23a and by-passed the blisters 25 and 25a at the block valve 22. The block 28 was progressively closed down, to restrict the passage of the material and create an increasing back-pressure therein. This back-pressure was increased until a barrel temperature of between 300°–350°F was reached. The heat from mechanical working of the material in the compression zone was sufficient for the drying process. Small amounts of steam were added during the operation to balance the heat loss by radiation. The back-pressure in the compression zone 37 varied from about 750 to about 2,500 psi.

The back-pressure built up in the material in the compression zone was sufficient to prevent evaporation of the water present in the material. Some water was expelled from the material and was forced back along the bores towards the inlet. As the pressure in the material upstream reduced, so this water evaporated and escaped through the inlet 21 and hopper 12 to atmosphere. The polybutadiene material was expelled from block valve 22 into the continuations of bores 16 and 16a where the pressure was considerably lower than that upstream of the valve and very close to atmospheric pressure. Rapid evaporation of the residual water present in the dewatered material caused the material to expand and rupture into crumb form. The material was then conveyed along the continuation bores by the screws with continued formation of water vapour, which finally escaped over the crumb to atmosphere at the outlet 13. The material issued from the outlet 13 at a temperature of about 270°F, and was conveyed on the cooler/conveyor system 14 to baling machines. The final moisture content was about 0.3 percent.

A dual screw 6-inch extrusion dryer provided with a 500 HP drive means and operated in accordance with the present invention yielded up to 9,000 lbs. of dry polybutadiene product per hour using only 300 of the available HP of the drive means. Productivity rates of this order of magnitude were maintained over prolonged periods of operation so that the production/power ratio was in the order of about 30 lbs. of product per HP per hour.

The same extrusion dryer having an additional single screw section at the outlet end and operated with a die at the outlet, i.e., not in accordance with this invention, delivered up to 3,500 lbs/hr. steady production at almost full power. Barrel temperature was between 390° – 430°F, resulting in scorching and even ignition of the dried polymer at the outlet. Average productivity was in the order of a ratio of 7 lbs. of product per HP per hour. The temperature of the extrudate was reduced to a level of about 350°F by venting off the volatile material downstream of the restriction; unfortunately it resulted in a loss through the vent system of nearly 1,000 lbs/hr of the polybutadiene material in the form of fines.

EXAMPLE 2

Three extrusion drying runs were carried out on different polymers using the procedure and the dual screw extrusion dryer as described in Example 1. The polymers, all dewatered to a moisture level of 5–8 percent, were as follows:

A. a masterbatch of 100 parts of cis-1,4 polybutadiene and 37.5 parts of a highly aromatic extender oil having a Mooney viscosity (M/L-4' at 212°F) of 36;

B. a butyl rubber having a Mooney viscosity (M/L-8' at 212°F) of 45 and an unsaturation level of 0.7 mol. percent; and C. a brominated butyl rubber containing 2.0 percent bromine and having a Mooney viscosity (M/L-4' at 257°F) of 51.

The data are shown in the table below

TABLE I

| Run | 1 | 2 | 3 |
|---|---|---|---|
| Polymer | A | B | C |
| Initial moisture (%) | 5 | 6 | 8 |
| Compression zone temp. (°F) | 300 | 350 | 300 |
| Polymer temp. at outlet (°F) | 260 | 280 | 230 |
| Final moisture (%) | 0.3 | 0.3 | 0.75 |
| Av. power consumption (HP) | 200 | 220 | 200 |
| Av. throughput (lbs/hr) | 7000 | 6000 | 4000 |
| Av. throughput/power ratio (lbs/hr/HP) | 30 | 27 | 20 |

All these runs indicated that various polymers could be effectively dried at high rates at safe peak temperatures.

A comparative experiment was carried out with polymer C using a conventional duel screw extrusion dryer. The temperature in the barrel rose to about 350°F at which temperature the polymer degraded a scorched black mass.

What is claimed is:

1. An improved extruder for drying extrudable polymeric material having at least one rotatable worm screw extending throughout the bore of an elongated extruder barrel having an inlet at one end for introduction of wet material and a single, unrestricted terminal outlet for dry material and vapour at the other end and comprising four serially interconnected zones:

a. a feed zone for receiving and forwarding said material from said inlet;

b. a compression zone wherein said screw is a compression screw for working and compressing said material from said feed zone;

c. a restriction zone comprising a blister on said screw and adjustable restriction means cooperating with said blister to variably control the flow of said material through said zone and to provide a back pressure in said compression zone; and d. an expansion zone wherein said screw is a conveying screw for advancing said material towards said single, unrestricted terminal outlet of an area not less than the area of the polymeric path through said expansion zone and open to ambient atmosphere.

2. An improved extruder as claimed in claim 1, wherein said compression worm screw has a compression ratio increasing from said feed zone to said restriction zone.

3. An improved extruder as claimed in claim 1, wherein the running surface of said blister is provided with shallow reverse flights.

4. An improved extruder as claimed in claim 1, wherein said conveying worm screw in said expansion zone is of low stem diameter and coarse pitch.

5. An improved extruder as claimed in claim 1, wherein said extruder barrel includes heat exchange means.

* * * * *

UNITED STATES PATENT OFFICE
CERTIFICATE OF CORRECTION

PATENT NO. : 3,874,090
DATED : April 1, 1975
INVENTOR(S) : Nathan John Mc CRACKEN It is certified that error appears in the above-identified patent and that said Letters Patent are hereby corrected as shown below:

In the Heading:

[73] Change "Calif." to -- Canada --.

Signed and sealed this 27th day of May 1975.

(SEAL)
Attest:

RUTH C. MASON
Attesting Officer

C. MARSHALL DANN
Commissioner of Patents
and Trademarks